UNITED STATES PATENT OFFICE.

LEWIS FRANCIS AND CYRUS H. LOUTREL, OF NEW YORK, N. Y., ASSIGNEES OF LEWIS FRANCIS AND FREDK. W. LETMATE, OF SAME PLACE.

IMPROVED COMPOSITION FOR INKING ROLLERS, PADS, AND OTHER PRINTING PURPOSES.

Specification forming part of Letters Patent No. 43,192, dated June 21, 1864; Reissue No. 2,805, dated November 26, 1867.

*To all whom it may concern:*

Be it known that LEWIS FRANCIS and FREDERICK W. LETMATE, of the city, county, and State of New York, have invented, made, and applied to use a new and useful Composition for Printing Purposes; and we do hereby declare that the following is a full, clear, and correct description thereof.

The nature of the invention consists in combining glue and glycerine, with or without molasses, to form a composition for printing purposes.

In the manufacture of the composition the following are the ingredients and proportions found to be advantageous, and which may be generally adopted: glycerine, four (4) parts; glue, two (2) parts; molasses, (when used,) one (1) part.

The composition heretofore used for printing purposes has been composed of glue and molasses, which soon dries up, shrinks, and becomes hard, thereby losing its suction, which renders it unfit for use.

To produce a composition for printing purposes which will not be affected by the changes in the atmosphere or by long use and be at all times ready for use is the object of the present invention. This is accomplished by substituting glycerine in part or wholly for molasses, the peculiar nature of the glycerine preventing the composition from becoming dry and hard.

The glue is first melted in the usual manner, and afterward the glycerine and molasses (if used) are added, and the whole allowed to boil about twenty minutes, when the composition is in a suitable state for casting.

The composition thus made will be found applicable to printing on glass, porcelain, and iron, and to the manufacture of a superior article of inking-rollers.

The elastic nature of the composition renders it particularly desirable for printing on rough or uneven surfaces, while rollers made from it are more durable, have a better suction, and retain it for years, and can be furnished at a cost not exceeding that of the ordinary roller.

The proportions above recited may be varied in many cases, and sometimes advantageously.

The composition may also be applied to printing on many substances not above enumerated.

What is claimed as the invention of the said LEWIS FRANCIS and FREDERICK W. LETMATE is—

A composition made substantially as described for printing purposes.

LEWIS FRANCIS.
CYRUS H. LOUTREL.

In presence of—
A. SIDNEY DOANE,
W. D. EVERIT.